United States Patent [19]
MacMillan et al.

[11] Patent Number: 5,105,592
[45] Date of Patent: Apr. 21, 1992

[54] FIRE BARRIER DEVICE

[75] Inventors: George S. MacMillan; Tracy L. Fields, both of Coral Springs, Fla.

[73] Assignee: Fire Barrier Installations, Inc., Coral Springs, Fla.

[21] Appl. No.: 611,711

[22] Filed: Nov. 13, 1990

[51] Int. Cl.$^5$ .......................... F16K 17/38; E04B 5/48
[52] U.S. Cl. .................................................... 52/232
[58] Field of Search .................... 52/232, 221, 573, 1; 138/149; 277/26

[56] References Cited

U.S. PATENT DOCUMENTS

| | | | |
|---|---|---|---|
| 4,061,344 | 12/1977 | Bradley et al. | 27/26 |
| 4,109,423 | 8/1978 | Perrain | 52/1 |
| 4,136,707 | 1/1979 | Gaillot | 52/232 |
| 4,221,092 | 9/1980 | Johnson | 52/232 |
| 4,364,210 | 12/1982 | Fleming et al. | 52/221 |
| 4,538,389 | 9/1985 | Heinen | 52/221 |
| 4,642,956 | 2/1987 | Harbeke | 52/232 |
| 4,796,401 | 1/1989 | Wexler | 52/232 |
| 4,850,385 | 7/1989 | Harbeke | 52/232 |
| 4,894,966 | 1/1990 | Bailey | 52/232 |
| 4,916,800 | 4/1990 | Harbeke | 52/232 |
| 4,936,064 | 6/1990 | Gibb | 52/232 |
| 4,967,527 | 11/1990 | Gohlke | 52/573 |
| 4,999,962 | 3/1991 | Gohlke | 52/573 |

*Primary Examiner*—John E. Murtagh
*Attorney, Agent, or Firm*—Oltman and Flynn

[57] ABSTRACT

In accordance with the invention there is provided a fire barrier device for stopping passage of fire through openings in partitions for plastic pipe. The device includes an outer metallic sleeve; a radially extending flange attached to one end of the sleeve; an inner, tubular, non-metallic coupling axially disposed between the sleeve and the plastic pipe, spaced radially inward from the sleeve, forming a space between the sleeve and the coupling; a wrapping or filling of intumescent material that fills that space; and a layer of caulking material abutting an end surface of the wrapping of intumescent material.

15 Claims, 2 Drawing Sheets

FIRE BARRIER DEVICE

The invention relates to a fire barrier device for stopping passage of fire through partitions and floors, and more particularly through openings in partitions and floors for plastic pipes.

BACKGROUND AND PRIOR ART

In partitions such as floors, walls and ceilings made of poured concrete it is necessary to have openings for admitting pipes conducting liquids such as water and liquid wastes and the like. In order to prevent fire from spreading from one side of a partition to the other side, such openings must be filled with fire resistant materials in order to meet existing fire protection codes.

In recent years it has become the practice to use pipes made of plastic, such as polyvinyl chloride and the like instead of steel, cast iron and copper as used in earlier times.

Since plastic pipes become soft, melt and burn at elevated temperatures that normally would not affect metal pipes, it has become necessary to introduce a fire barrier that obturates not only the space around the pipes, but also the empty space remaining after a plastic pipe has melted or burned away.

Several inventions have shown devices for solving this problem. U.S. Pat. No. 4,796,401, for example, shows a composite fire stop device including a collar that can slide over a plastic pipe and fill the space between the poured concrete and the pipe. The collar includes an intumescent material packed around the collar, and circular tension springs that constrict the pipe as it becomes soft from the heat of the fire, while the intumescent material expands and obturates the void created by the melting pipe. U.S. Pat. No. 4,538,389 shows a fire-break device which includes a two-part collar of substantially incombustible material mounted around the pipe, and a slidable flange filling a space between the pipe and the collar. U.S. Pat. No. 4,221,092 shows a fire barrier including a packing of intumescent material packed into the space between a pipe and the poured concrete.

The fire barrier devices of the prior art have, however, certain disadvantages in that they do not show a self-contained single assembly that can be readily installed on a construction site, and become an integral part of a pipe system. Applicants' invention overcomes these problems by providing a self-contained, one-piece assembly that is an integral part of a pipe system for fluid-filled and air-vented PVC pipe systems, which has the further advantages of including a metallic casing that allows the firestop material to be replaced if needed, and has no external parts to activate or control intumescent action. Furthermore, it avoids the need for drilling holes in concrete partitions; is not unnecessarily complex or costly; and avoids unnecessary cutting and splicing of PVC pipe.

SUMMARY OF THE INVENTION

In accordance with the invention there is provided a fire barrier device for stopping passage of fire through openings in partitions for plastic pipe. The device includes an outer metallic sleeve; a radially extending flange attached to one end of the sleeve; an inner, tubular, non-metallic coupling axially disposed between the sleeve and the plastic pipe, spaced radially inward from the sleeve, forming a space between the sleeve and the coupling; a wrapping or filling of intumescent material that fills that space; and a layer of caulking material abutting an end surface of the wrapping of intumescent material.

In accordance with a further feature there is provided a fire barrier device wherein the layer of caulking is arranged abutting the end surface of the wrapping that faces away from the flange, and it may further include a securing arrangement for axially securing the coupling to the sleeve. The securing arrangement may further include a plurality of shoulder screws circumferentially spaced about the sleeve circumference, penetrating the sleeve and the wrapping of intumescent material, and engaging the tubular coupling. The shoulder screws penetrate the tubular coupling to substantially mid-depth of the tubular coupling, and the tubular coupling is advantageously made of polyvinyl chloride.

According to a further feature, there is provided a fire barrier wherein the partition is a slab of concrete of a given thickness and the metallic sleeve has a length substantially equal to the thickness of the slab.

According to a still further feature, the tubular sleeve is made of galvanized steel, wherein the galvanized steel may be of a thickness of at least thirty gauge, and wherein the flange is welded to the sleeve.

Further objects and advantages of this invention will be apparent from the following detailed description of a presently preferred embodiment which is illustrated schematically in the accompanying drawings.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DESCRIPTION OF THE PREFERRED EMBODIMENTS

Figure 1:
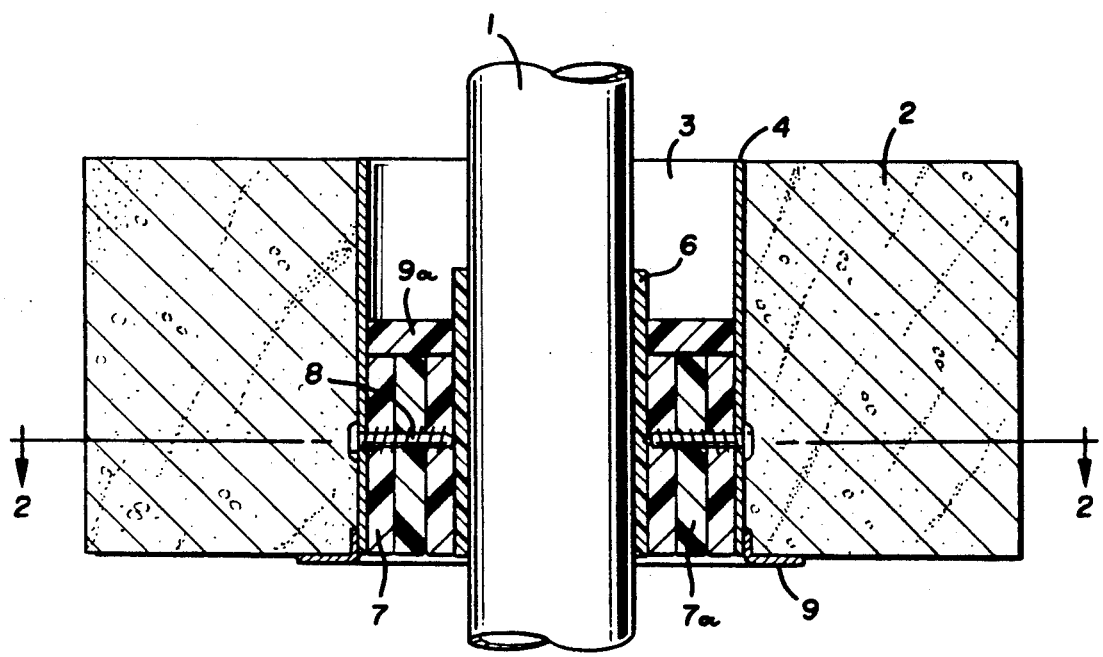
FIG. 1 is an elevational cross-sectional view of the invention as installed with a plastic pipe.
Figure 2:
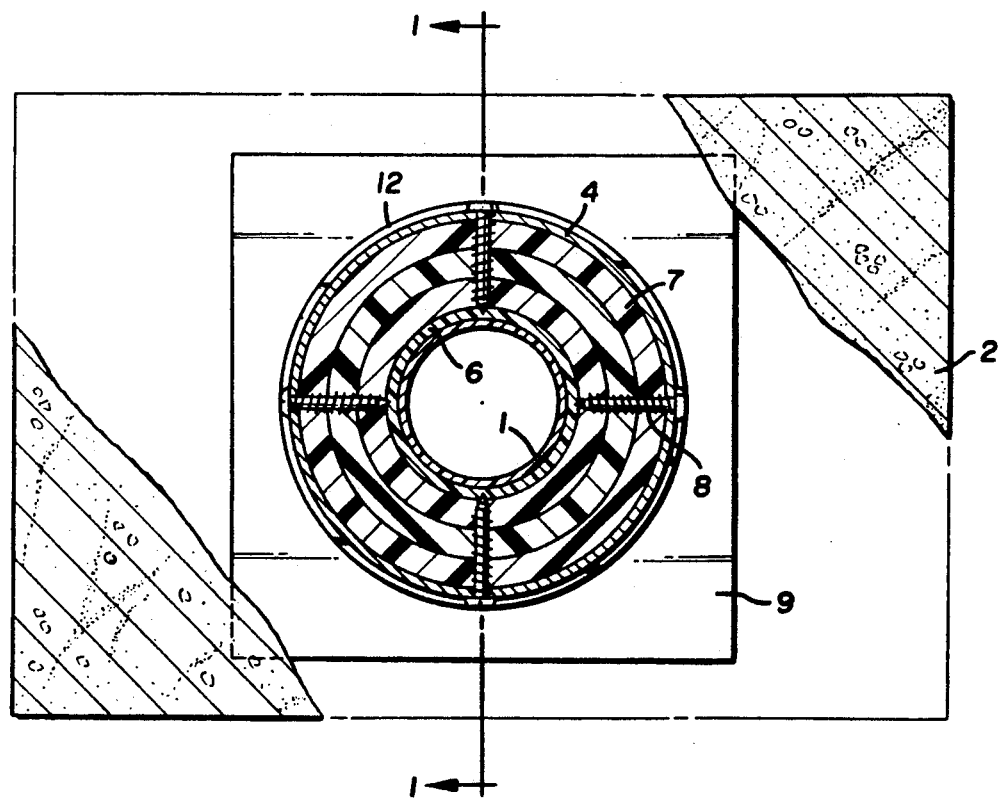
FIG. 2 is a plan cross-sectional view of the invention seen along the line 2—2 of FIG. 1.
Figure 3:
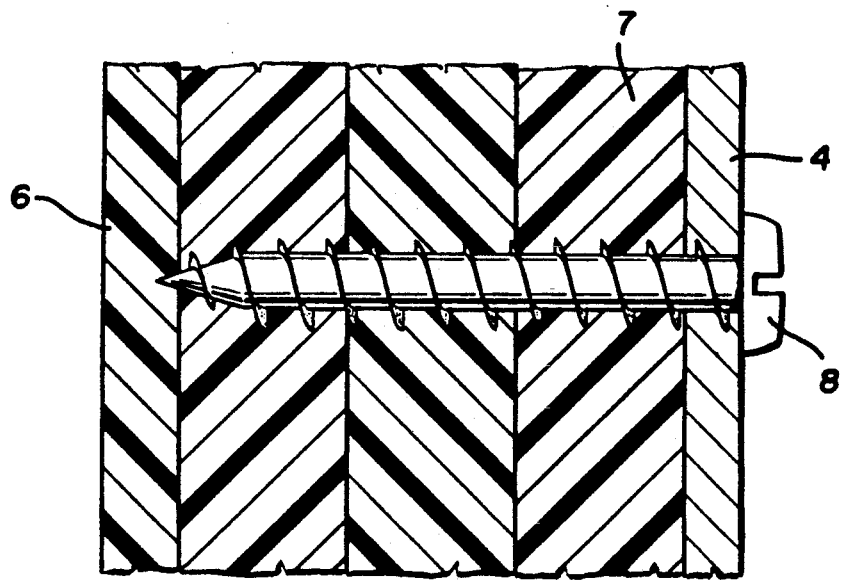
FIG. 3 is a cross-sectional fragmentary enlarged detail view of the invention showing a cross-section of intumescent material and a shoulder screw.
Figure 4:
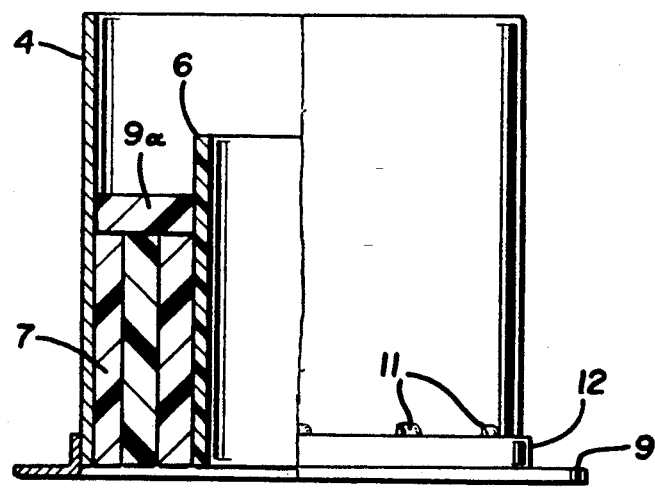
FIG. 4 is an elevational view of the invention.

In FIGS. 1, 2 and 4 a plastic pipe 1 is shown installed through an opening 3 in a partition 2 of poured concrete. The partition 2 may be a floor, a wall, a ceiling or any other type of structural barrier as may be found in a building wherein there is a need for separating the two sides of the structural barrier 2 by means of a fire barrier in order to avoid a fire from one side of the barrier to spread through the opening 3 to the other side.

A metallic sleeve 4 is inserted in the poured concrete, advantageously at the time the partition is poured. The metallic sleeve 4 is advantageously made of galvanized steel of a thickness of at least 30 gauge, which will enable it to withstand the pressure of the poured concrete. Metallic sleeve 4 heats up and causes actuation of intumescent wrap strips in a more rapid manner.

A tubular coupling 6 of thermo-plastic material, e.g. PVC, is positioned coaxially in the sleeve 4 with its wall spaced radially inward from the wall of the sleeve 4, so that a space 7a is formed between the two walls.

The space between the walls is filled with intumescent material 7, which has the ability of expanding to a considerably greater volume when heated above a certain temperature as determined by the composition of the intumescent material. The intumescent material is advantageously in the form of wrapping strips, e.g. of the type known as 3M FS-195 manufactured by 3M Corporation or Dow Corning 2002 intumescent wrap strip. In this form, the strips are wound around the tubular coupling 6, for example in three layers as seen in the FIGS. depending upon the diameter of the tubular coupling.

The tubular coupling 6 has an inside diameter such that the pipe 1 can expand or contract with the tubular coupling when the pipe is heated or cooled.

The tubular coupling 6 is advantageously secured by means of circumferentially spaced pointed shoulder screws 8 threadedly inserted through the wall of the metallic sleeve 4, penetrating the intumescent material 7 and partially penetrating the wall of the tubular coupling 6, e.g. to a depth of midway into the wall. The coupling 6 may be secured to the pipe 1 with PVC adhesive.

A layer 9a of caulking material, e.g. known as 3M, CP-25 from 3M Corporation, is placed in the space between the metallic sleeve 4 and the tubular coupling 6, abutting one end surface of the intumescent material 7. The sealing material serves to prevent passage of heated air and gasses from a fire on one side of the partition 2 to travel through the space between the layers of intumescent material 7 to the other side of the partition.

A flange 9 is attached to the bottom end of the metallic sleeve 4 in order to position the fire barrier device on the pouring form before pouring of the concrete when the partition is poured during construction. In constructing the barrier device the flange is advantageously made as a separate piece which is welded to the metallic sleeve 4, e.g. by spot welds 11, seen in FIG. 4. The flange 9 is advantageously made as a square piece of galvanized steel with a circular opening with an upstanding collar 12 for receiving the metallic sleeve 4.

It follows that the fire barrier device can be made in any suitable sizes to accommodate different size plastic pipe 1 and thickness of the partition 2. Typically the size may vary from 1¼" to 7¼" in diameter and from 4" to 12" in height to accommodate different thicknesses of the partition.

The sealing layer 9a may typically be ¼" deep.

I claim:

1. A fire barrier device for stopping passage of fire through an opening in a partition for plastic pipe, comprising an outer metallic sleeve extending into said opening; an inner, tubular, non-metallic coupling coaxially disposed between said sleeve and said plastic pipe, spaced radially inward from said sleeve forming a space between the sleeve and the coupling; a wrapping of intumescent material filling said space; and a layer of caulking material abutting an end surface of said wrapping to prevent gases and hot air from passing from one side of the partition to the other side through the wrapping of intumescent material.

2. A fire barrier device according to claim 1, wherein said layer of caulking is disposed abutting either end surface of said wrapping.

3. A fire barrier device according to claim 1, including securing means for axially securing said coupling to said sleeve.

4. A fire barrier according to claim 3, wherein said securing means include a plurality of shoulder screws circumferentially disposed about said sleeve, penetrating said sleeve and said wrapping of intumescent material, and engaging said tubular coupling.

5. A fire barrier device according to claim 4, wherein said shoulder screws penetrate said tubular coupling.

6. A fire barrier according to claim 5 wherein said shoulder screws penetrate said tubular coupling to substantially mid-depth of said tubular coupling.

7. A fire barrier according to claim 1, wherein said tubular coupling is made of polyvinyl chloride.

8. A fire barrier according to claim 1, wherein said partition is a slab of concrete of a given thickness, and said sleeve has a length substantially equal to the thickness of said slab.

9. A fire barrier according to claim 1, wherein said sleeve is made of galvanized steel.

10. A fire barrier according to claim 9, wherein said galvanized steel is of a thickness of at least thirty gauge.

11. A fire barrier according to claim 1, additionally comprising a radially extending flange attached to one end of said sleeve.

12. A fire barrier according to claim 11, wherein said flange is welded to said sleeve.

13. A fire barrier device for stopping passage of fire through openings in partitions for plastic pipe, comprising an outer metallic sleeve; a radially extending flange attached to one end of said sleeve; an inner, tubular, non-metallic coupling coaxially disposed between said sleeve and said plastic pipe, spaced radially inward from said sleeve forming a space between the sleeve and the coupling; a wrapping of intumescent material filling said space; and a layer of caulking material abutting an end surface of said wrapping, including securing means for axially securing said coupling to said sleeve, wherein said securing means include a plurality of shoulder screws circumferentially disposed about said sleeve, penetrating said sleeve and said wrapping of intumescent material, and engaging said tubular coupling.

14. A fire barrier as in claim 13, wherein said shoulder screws penetrate said tubular coupling.

15. A fire barrier as in claim 14, wherein said shoulder screws penetrate said tubular coupling to substantially mid-depth of said tubular coupling.

* * * * *